Patented Oct. 3, 1944

2,359,329

UNITED STATES PATENT OFFICE 2,359,329

QUINOLINE SUBSTITUTED DIHYDROPYRIDINES

Arthur P. Phillips, New York, and Lowell O. Randall, Tuckahoe, N. Y., assignors to Burroughs Wellcome & Co. (U. S. A.), Inc., New York, N. Y., a corporation of New York No Drawing. Application June 18, 1943, Serial No. 491,386

12 Claims. (Cl. 260—283)

Our invention relates to a new group of chemical compounds which have properties making them useful for medicinal purposes, e. g. as analgesics, spasmolytics, local anesthetics and morphine substitutes. Our invention also relates to the process of synthesizing the new compounds.

One of the principal objects sought and attained by our invention is the production of chemical compounds which are capable of being used as substitutes for morphine while being devoid of the habit forming characteristics of morphine.

Another object is to provide chemical compounds which are effective for a multiplicity of uses in the field of medicine.

Still another object of the invention is to provide a method of synthesizing the new compounds by simple processes capable of careful supervision in large scale production.

The typical structure of our new compounds may be represented by the following general formula

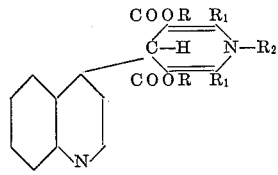

where $R$ and $R_1$ are alkyls containing from 1 to 5 carbon atoms and $R_2$ is either hydrogen or an alkyl containing from 1 to 5 carbon atoms.

For many purposes, it has been found advantageous to convert these compounds into their acid addition salts, preferably by a treatment with a non-oxidizing and non-toxic acid, such as hydrochloric acid, hydrobromic acid, phosphoric acid, boric acid, acetic acid, citric acid and lactic acid.

As an example, pharmacological tests made with 4-(4'-quinolyl)-2,6-dimethyl-3,5-dicarbethoxy-1,4-dihydropyridine, and its hydrochloric acid addition salt, have shown a very high potency of the new compound as an analgesic and a local anesthetic accompanied by a comparatively low toxicity.

According to our invention the new basic products are obtained by heating quinoline-4-aldehyde with one or several reagents capable of forming with the carbon of the aldehyde the pyridine ring attached to the quinolyl radical.

Thus, one mole of quinoline-4-aldehyde may be reacted with two moles of an alkyl ester of a beta amino or a beta-alkyl-amino alpha-beta unsaturated aliphatic acid having from 1 to 5 carbon atoms in each alkyl group and from 4 to 8 carbon atoms in the acyl group. The reaction is continued until one mole water and one mole ammonia have been liberated.

Alternatively, each mole of the quinoline-4-aldehyde may be reacted with a mixture containing one mole of an alkyl ester of a beta-amino or a beta-alkyl-amino, alpha-beta-unsaturated aliphatic acid of the type set forth above and one mole of an alkyl ester of a beta-keto aliphatic acid having from 1 to 5 carbon atoms in the alkyl group and from 4 to 8 carbon atoms in the acyl group. In this case two moles of water are liberated in the reaction.

According to a further modification of our process, one mole of a qinoline-4-aldehyde may be heated with two moles of an alkyl ester of a beta-keto aliphatic acid as described above in the presence of at least one mole of ammonia or of a primary alkyl-amine containing between 1 and 5 carbon atoms. Three moles of water are liberated in the reaction.

The following examples are intended to illustrate without limiting the invention.

Example 1

1 mole of quinoline-4-aldehyde was mixed with 2 moles of ethyl beta-amino-crotonate and heated for 8 to 10 hours at a temperature of from 90 to 120° C. The cooled reaction mixture was washed out with ether, leaving the final product. Recrystallized from aqueous alcohol, the yield consisted of prismatic yellow crystals of M. P. 201.5 to 203° C.

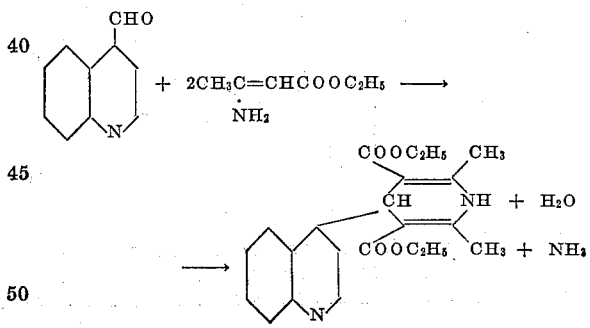

Example 2

1 mole of quinoline-4-aldehyde was mixed with 1 mole each of ethyl beta-amino crotonate and ethyl aceto acetate. The mixture was heated as in Example 1. After completion of the reaction the cooled mixture was dissolved in alcohol and the product precipitated with water. Recrystallization from aqueous alcohol yielded exactly the same product as Example 1.

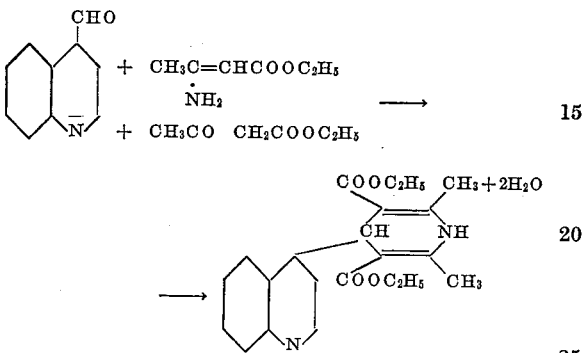

Example 3

1 mole of quinoline-4-aldehyde was reacted with 2 moles of ethyl aceto acetate in the presence of a solvent such as toluene and at least one mole of either aqueous or alcoholic ammonia for the same time and at the same temperature as the reaction mixture in Example 1. Extraction and recrystallization led to exactly the same product as in the preceding examples.

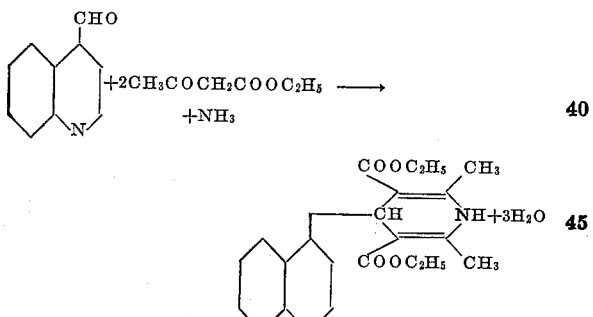

Example 4

1 mole of quinoline-4-aldehyde and 2 moles of methyl-beta-ethyl-beta-amino-a c r y l a t e were treated for 6 to 8 hours at 90 to 120° C. The product was worked up as in the previous example.

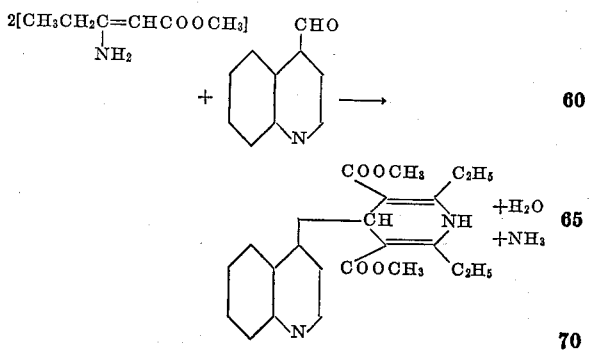

Example 5

1 mole of quinoline-4-aldehyde, 1 mole of propyl-beta-butyl-beta-methyl amino acrylate, and 1 mole propyl valeryl acetate were heated for 6 to 7 hours at 90 to 120° C. The product was purified as in Examples 1 to 4.

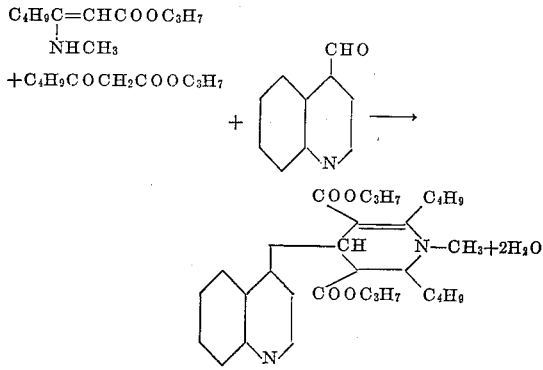

Example 6

1 mole of quinoline-4-aldehyde, 2 moles of ethyl butyryl acetate and a little more than 1 mole of ethyl amine were heated for 6 to 8 hours at 90 to 120° C. and the reaction mixture was worked up as described in Example 2.

$2[C_3H_7COCH_2COOC_2H_5]$

[reaction scheme yielding product with $COOC_2H_5$, $C_3H_7$ substituents, $N-C_2H_5 + 3H_2O$]

Example 7

1 mole of quinoline-4-aldehyde, 1 mole of ethyl-beta-amyl-beta-propylamino-acrylate and 1 mole of ethyl capronyl acetate were heated for 6 to 8 hours at 90 to 120° C. and the reaction product was obtained as in Example 1.

$C_5H_{11}-C=CHCOOC_2H_5$
       $|$
       $NHC_3H_7$ $+C_5H_{11}COCH_2COOC_2H_5$

[reaction scheme yielding product with $COOC_2H_5$, $C_5H_{11}$ substituents, $NC_3H_7 + 2H_2O$]

We claim:
1. As a new substance a compound possessing the following general formula:

[structural formula with COOR, $R_1$, C-H, $N-R_2$, COOR, $R_1$ substituents on quinoline]

where R and $R_1$ are alkyls containing from 1 to 5 carbon atoms and $R_2$ is a radical selected from the group consisting of hydrogen and the alkyls containing from 1 to 5 carbon atoms.

2. As a new substance a compound possessing the following general formula:

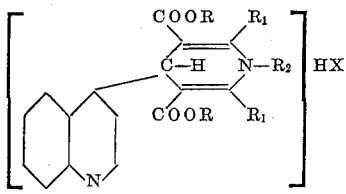

where R and R₁, are alkyls containing from 1 to 5 carbon atoms, R₂ is a radical selected from the group consisting of hydrogen and the alkyls containing from 1 to 5 carbon atoms, and X is an acid radical.

3. As a new substance, a compound possessing the following general formula:

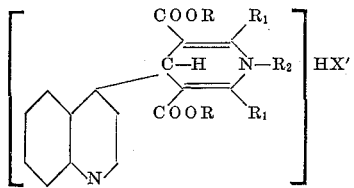

where R and R₁ are alkyls containing from 1 to 5 carbon atoms, R₂ is a radical selected from the group consisting of hydrogen and the alkyls containing from 1 to 5 carbon atoms, and X′ is the radical of a non-oxidizing acid.

4. As a new substance, a compound possessing the following general formula:

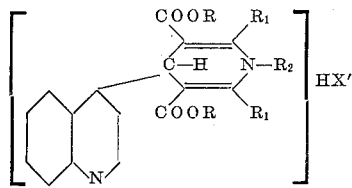

where R and R₁ are alkyls containing from 1 to 5 carbon atoms, R₂ is a radical selected from the group consisting of hydrogen and the alkyls containing from 1 to 5 carbon atoms, and X″ is the radical of a non-oxidizing, non-toxic acid.

5. As a new substance a compound possessing the following general formula:

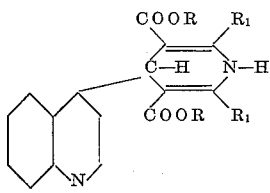

where R and R₁ are alkyls containing from 1 to 5 carbon atoms.

6. As a new substance 4-(4′-quinolyl)-2,6-dimethyl-3,5-dicarbethoxy-1,4-dihydropyridine.

7. As a new substance an acid addition salt of 4 - (4′ - quinolyl) - 2,6 - dimethyl - 3,5 - dicarbethoxy-1,4-dihydropyridine.

8. As a new substance the hydrochloric acid salt of 4-(4′-quinolyl)-2,6-dimethyl-3,5-dicarbethoxy-1,4-dihydropyridine.

9. A process of producing a compound having the general formula

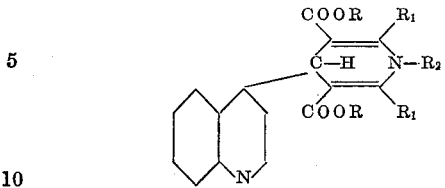

where R and R₁ are alkyls containing from 1 to 5 carbon atoms and R₂ is a radical selected from the group consisting of hydrogen and the alkyls containing from 1 to 5 carbon atoms, said process comprising the steps of heating quinoline-4-aldehyde with a substance selected from the group consisting of (a) The alkyl esters of beta-amino and the beta-alkyl-amino alpha-beta unsaturated aliphatic acids having from 1 to 5 carbon atoms in each alkyl group and from 4 to 8 carbon atoms in the acyl group, (b) The mixtures of alkyl esters of the beta-amino and the beta-alkyl-amino alpha-beta unsaturated aliphatic acids having from 1 to 5 carbon atoms in each alkyl group and from 4 to 8 carbon atoms in the acyl group with alkyl esters of beta-keto aliphatic acids having from 1 to 5 carbon atoms in the alkyl group and from 4 to 8 carbon atoms in the acyl group, (c) The mixtures of alkyl esters of beta-keto aliphatic acids having from 1 to 5 carbon atoms in the alkyl group and from 4 to 8 carbon atoms in the acyl group with a nitrogen compound selected from the group consisting of ammonia and the primary alkyl amines containing from 1 to 5 carbon atoms.

10. The process of producing 4-(4′-quinolyl)-2,6 - dimethyl - 3,5 - dicarbethoxy - 1,4 - dihydropyridine, which process comprises the steps of heating 1 mole of quinoline-4-aldehyde with 2 moles of ethyl beta-amino crotonate to a temperature between 90 and 120° C. until the reaction is completed, cooling the mixture and extracting and recrystallizing the reaction product.

11. The process of producing 4-(4′-quinolyl)-2,6 - dimethyl - 3,5 - dicarbethoxy - 1,4 - dihydropyridine, which process comprises the steps of heating 1 mole of quinoline-4-aldehyde with 1 mole of ethyl beta-amino crotonate and 1 mole of ethyl aceto-acetate to a temperature between 90 and 120° C. until the reaction is completed, cooling the mixture and extracting and recrystallizing the reaction product.

12. The process of producing 4-(4′-quinolyl)-2,6 - dimethyl - 3,5 - dicarbethoxy - 1,4 - dihydropyridine, which process comprises the steps of heating 1 mole of quinoline-4-aldehyde with two moles of ethyl aceto-acetate in the presence of at least one mole of ammonia to a temperature between 90 and 120° C. until the reaction is completed, cooling the mixture and extracting and recrystallizing the reaction product.

ARTHUR P. PHILLIPS.
LOWELL O. RANDALL.